United States Patent
Ny (10) Patent No.: US 10,432,079 B2
(45) Date of Patent: Oct. 1, 2019

(54) ELECTRICAL ENERGY GENERATING BRUSHLESS DC MOTOR

(71) Applicant: Thou M. Ny, Fairfield, CA (US)

(72) Inventor: Thou M. Ny, Fairfield, CA (US)

(*) Notice: Subject to any disclaimer, the term of this patent is extended or adjusted under 35 U.S.C. 154(b) by 443 days.

(21) Appl. No.: 14/457,817

(22) Filed: Aug. 12, 2014

(65) Prior Publication Data

US 2016/0049854 A1    Feb. 18, 2016

(51) Int. Cl.
*H02K 53/00*    (2006.01)
*H02K 11/215*   (2016.01)
(Continued)

(52) U.S. Cl.
CPC .............. *H02K 53/00* (2013.01); *B60L 50/12* (2019.02); *H02K 11/215* (2016.01); *H02P 9/00* (2013.01);
(Continued)

(58) Field of Classification Search
CPC .......... H02K 3/00; H02K 23/00; H02K 23/26; H02K 23/36; H02K 23/52; B60L 11/06; Y10S 74/09; H02P 9/00; Y02T 10/641
(Continued)

(56) References Cited

U.S. PATENT DOCUMENTS 3,483,456 A    12/1969   Brenner et al.
3,903,463 A *  9/1975    Kanamori .............. H02P 6/22
                                                  318/400.09
(Continued)

FOREIGN PATENT DOCUMENTS

CN    2423677 Y    3/2001
CN    2730014 Y    9/2005
(Continued)

OTHER PUBLICATIONS

Welch, Richard, "Exlar; A More Efficient Servomotor", Product Description, *Exlar* Official Website, http://www.exlar.com/pages/380-A-More-Efficient-Servomotor. Accessed Jun. 5, 2014.
(Continued)

*Primary Examiner* — John K Kim
*Assistant Examiner* — Minki Chang
(74) *Attorney, Agent, or Firm* — Leydig, Voit & Mayer, Ltd.; Gerald T. Gray (57) ABSTRACT

A brushless direct current (BLDC) motor that generates electrical energy (AC voltage) while operating as a motor. The motor is configured with a dual purpose stator assembly wherein one segment of the stator assembly includes coil windings to produce the rotary force (torque) in the rotor and the other segment of the stator assembly includes coil windings to generate electrical energy. The stator windings for producing torque are electrically connected through commutation control circuitry to a DC supply source, and the stator windings for generating electrical energy are connected to a load or to an energy storage system. Thus, the embodiment offers a novel means for generating electrical energy in the conventional BLDC motors. Because the motor can generate electrical energy while operating as a motor, it can effectively serve as a powertrain in electric vehicles, whereby the electrical energy it generates can be used to extend the vehicles' drive range.

17 Claims, 3 Drawing Sheets

(51) Int. Cl.
    *B60L 11/06*         (2006.01)
    *H02P 9/00*          (2006.01)
    *B60L 50/12*         (2019.01)

(52) U.S. Cl.
    CPC ............ *Y02T 10/641* (2013.01); *Y02T 10/646* (2013.01); *Y02T 10/70* (2013.01); *Y02T 10/7077* (2013.01); *Y10S 74/09* (2013.01)

(58) Field of Classification Search
    USPC ........................................ 310/179, 195, 210
    See application file for complete search history.

(56) References Cited

U.S. PATENT DOCUMENTS

| | | | |
|---|---|---|---|
| 3,930,190 A | 12/1975 | Liska | |
| 4,237,410 A | 12/1980 | Erickson et al. | |
| 5,164,622 A * | 11/1992 | Kordik | H02K 29/08 310/156.26 |
| 5,341,075 A | 8/1994 | Cocconi | |
| 5,804,904 A | 9/1998 | Park et al. | |
| 6,741,061 B2 | 5/2004 | Brown | |
| 6,965,183 B2 | 11/2005 | Dooley | |
| 7,109,671 B2 | 9/2006 | Bedini | |
| 7,884,580 B2 | 2/2011 | Lee | |
| 8,004,141 B2 * | 8/2011 | Jeung | H02K 21/16 310/156.45 |
| 8,283,831 B1 * | 10/2012 | Kaminsky | H02K 3/28 310/112 |
| 2002/0047401 A1 * | 4/2002 | Schoeb | F16C 32/0444 310/90.5 |
| 2005/0029890 A1 * | 2/2005 | Kadoya | B60K 6/26 310/180 |
| 2007/0132333 A1 | 6/2007 | Shim et al. | |
| 2010/0084938 A1 | 4/2010 | Palmer et al. | |
| 2010/0277023 A1 * | 11/2010 | Kamida | A61B 5/0488 310/156.01 |
| 2013/0328428 A1 | 12/2013 | Yang | |

FOREIGN PATENT DOCUMENTS

| | | |
|---|---|---|
| CN | 2800638 Y | 7/2006 |
| CN | 200947570 Y | 9/2007 |
| WO | WO 03/026121 A1 | 3/2003 |

OTHER PUBLICATIONS

Ozturk, S.B. et al., "Direct Torque and Indirect Flux Control of Brushless DC Motor", Transactions on Mechatronics, IEEE/ASME (vol. 16, Issue 2), Apr. 2011, pp. 351-360.

Singh, Bhim et al., "State of the Art on Permanent Magnet Brushless DC Motor Drives", Journal of Power Electronics, vol. 9, No. 1, Jan. 2009.

International Preliminary Report for Application No. PCT/US2015/044332, dated Feb. 23, 2017.

\* cited by examiner

ELECTRICAL ENERGY GENERATING BRUSHLESS DC MOTOR

BACKGROUND

The present disclosure relates to electric motors and generators or electrical power generating motors. In particular, the present disclosure relates to a sensor or sensorless brushless DC motor configured to generate AC electrical output while operating as a motor. Accordingly, the novel characteristics of the present disclosure include having a dual purpose stator assembly for producing torque in the rotor and for generating electrical energy output for load consumption. Thus, the embodiment offers a novel means for energy generation in BLDC motors. Further, its novel structural design as demonstrated by a prototype of a practical embodiment of the present disclosure allows it to achieve an efficiency level of 90-95%. This amount is greater than the conventional motor-generator (MG) set which operates on a 70% to 80% efficiency range. In addition, its dual functionality also allows it to effectively serve as powertrain in electric vehicles, while also adding significant advantages and capacity to extend the vehicles' drive range.

Conventional brushless DC motors are making significant contributions to the field of electric motor technologies. To generate torque, commutation methods of BLDC motors are accomplished through electromagnetic excitation by energizing the stator winding assembly using specific sequencing and algorithms. Rotor position sensing and commutation sequencing for torque generation are accomplished by the use of magnetic Hall Effect sensors and back electromotive force (BEMF) zero-crossing signals. BLDC motor technologies eliminate dangerous sparks, frictions, wear and tear that are the commonly known characteristics of the conventional brushed DC motors. Without brushes, the speed, durability, efficiency, and overall operations of BLDC motors are thus enhanced.

BLDC motors are also playing a strong and positive role in our environmental challenges caused by fossil fuels and combustion engines. Today, more and more electric vehicles are using BLDC motors as a powertrain, thus assisting in reducing fossil fuel consumption in the area of transportation. Integrated with advanced drivetrain and rechargeable batteries, electric vehicles have reached an impressive technological milestone of 140 to 240 miles per charge or drive range. BLDC motors are increasingly becoming more and more an integral part of this success.

However, despite their amazing capabilities and contributions, a deeper examination of their operating features reveals that their maximum potential has yet to be fully realized. Examining the relationship between the magnetic field of the permanent magnet rotor and the stator winding assembly during the motor's torque generation process reveals a foundation that is ripe for generating electrical energy while concurrently operating as a motor. For instance, while the motor is in active motoring function, as a byproduct of the energy expended to produce torque in the rotor, it also generates electrical energy known as back electromotive force (back—EMF). Upon being generated, this electrical energy or back-EMF travels in the opposite direction and opposes the supply voltages.

Nevertheless, electrical energy or EMF is being generated because all of the three fundamental conditions for how a voltage can be created exist while the motor is being driven. The first of the conditions is the presence of a magnetic field of the permanent magnet rotor. The second condition is the magnetic field being in motion, and the third, conductor or coil windings. The existence of these conditions is significant to the development of the present disclosure, especially the second aforementioned condition. For example, in order for the rotating magnetic field to exist in a conventional power generator, a separate prime moving force is often required to rotate the magnetic fields necessary to create electrical energy through the generator's stator windings. The prime moving force is usually furnished by a combustion engine, a turbine, or an electric motor. However, in the case of the BLDC motors, the supply energy input not only produces torque in the motor, it also brings into existence a condition ripe for electrical energy generation: a rotating magnetic field. Accordingly, by adding another segment of the third fundamental condition (a conductor or coil windings) and placing them in close vicinity relative to the motion of the rotating magnetic field, EMF or electrical energy can be generated.

As presented above, the maximum potential of the conventional BLDC motors has yet to be recognized or fulfilled. Thus it is desirable to fully utilize their potentials. By applying the principles of electromagnetic induction, and by placing a designated segment of coil windings arrangement relative to the motion of the rotor's magnetic field, the present disclosure provides an additional means for a BLDC motor to generate electrical energy while simultaneously operating as a motor. In accordance with the present disclosure, the generated electrical energy can then be harnessed, consumed immediately or be stored for later use that otherwise would have been wasted.

BRIEF SUMMARY

The present disclosure provides brushless direct current (BLDC) motors that generate electrical energy while operating as a motor. In certain embodiments, the BLDC motor of the present disclosure includes a dual purpose stator assembly for producing torque in the rotor and for generating electrical energy output for load consumption. The stator assembly is designed, in one embodiment, so that the stator poles can accommodate both windings and stator windings can be structured to maximize efficiency. For example, the stator winding assembly of one embodiment of the present disclosure is designed so that the torque producing segment of the windings are wound and placed farther away from the air gap and flux density of the permanent magnet rotor. Doing so allows less magnetic field density or lines of force to cut across the windings, thus limiting the amount of back-EMF generated in the motor. On the other hand, the winding segment for generating electrical energy can be placed at close proximity to the air gap where the flux density is strongest to allow for capturing the maximum magnetic field possible for generating electrical output. A prototype of one embodiment demonstrated an efficiency of 90-95%. Thus BLDC motors according to the present disclosure are more efficient than the conventional motor-generator set which operate on a typical efficiency range of 70% to 80%. Further, when the motor is operating under rated load, the generator feature advantageously produces at least 50% of electrical output of the input supply. The lighter the load being pressed upon the motor, the more electrical energy it can generate.

The BLDC motors described herein can be either sensor or sensorless motors. The motors are configured with a dual purpose stator winding assembly configured so that electrical energy can be generated while operating as a motor. To achieve this objective, one segment of the stator winding assembly is designated to produce torque in the rotor and the other is dedicated to generate electrical current. For simplicity, the stator windings for producing torque hereafter will be referred to as energizer windings and the stator windings for generating electrical energy hereafter will be referred to as inducer windings. Further, the permanent magnet rotor of the motors can be of various poles and the stator assembly can be of sufficient stator pole numbers, thus the motors can be operable in single-phase, or multiple phase winding configurations. For commutation, magnetic Hall Effect sensors and back-EMF zero-crossing signal sensing circuitry can be used, particularly for motors which operate on trapezoidal waveforms.

The conventional BLDC motors vary in their designs and features. Therefore, for the purpose of stator assembly arrangement according to the present disclosure, numerous possibilities could be implemented. For instance, in one embodiment of a 3-phase stator winding assembly of the present disclosure, six stator poles are presented on the stator assembly. Thus, to create the dual capacity capability in the motor, each of the six stator poles houses a pair of coil windings, an inducer winding segment and an energizer winding segment.

As noted earlier, conventional BLDC motors also generate electrical energy known as back electromotive force (back-EMF), namely because upon being generated, the electrical energy travels in the opposite direction and opposes the supply voltages. In the area of motor efficiency, back-EMF is considered as a constraint or challenge in the art, in part because to overcome the back-EMF value, more input energy is required to drive the motor, until equilibrium is reached. Because the conventional motors generate back EMF, it is one of the major power factor considerations during the design of a typical motor. Thus, to increase efficiency, the dual purpose stator assembly of the present disclosure can be designed to reduce the level of back-EMF being generated during motor operation. To this end, in certain embodiments, the stator assembly includes poles of sufficient length so that the energizer segment of the stator pole is wound and placed sufficiently far away from the air gap and the rotor's magnetic flux density. Placing the energizer windings as far away as possible from the air gap and flux density limits the amount of the rotor's magnetic field from cutting across the energizer coil windings, thereby limiting the amount of back-EMF from generating in the energizer windings. Thus, with less back-EMF to overcome, a lesser amount of energy from the supply input source is drawn to drive the motor. To this end, the length of stator poles can be optimized to accommodate both the inducer and energizer windings to allow for the motor's dual purpose functions to operate efficiently.

In another embodiment of the present disclosure, the motor is configured so that each of the inducer and energizer windings is wound separately on an individual stator pole, instead of both windings sharing the same stator pole. In one embodiment, a group of stator poles includes the energizer windings, while another group of equal amount of poles includes inducer windings. For instance, to accomplish this task in a typical 3-phase winding motor with six energizer stator poles, six more poles are added for the inducer windings. Together, the motor would house twelve poles, six for inducing and six for energizing. In certain aspects, to ensure that electrical degrees are balanced and uniformly distributed for both torque and electricity generation, each of the poles are alternately spaced next to each other around the inner circumference of the stator assembly frame. By alternating the inducer and energizer poles, placing one type next to the other, both dual functions of motor and generator activities can be accomplished at the same time.

As noted, a novel feature of the motors of the present disclosure is their ability to generate electrical energy. Consistent with the operating principles of the conventional AC generator, the amount of voltage induced in the inducer windings depends on a few factors: the strength of the rotor's magnetic field, the speed of which the magnetic field is moving across the windings, resistance and reactive power factors, and the number of the inducer coil winding turns placed in relative motion of the rotor's magnetic field. The greater the value to generate, the more the inducer coil winding turns are needed. The lesser the value of voltage to be generated, the smaller the number of inducer coil winding turns needed. However, it should be noted that to generate electrical energy in a conventional power generator, a separate prime moving force is often required to rotate the magnetic fields necessary to create electrical energy through the generator's stator windings. The prime moving force is usually furnished by a combustion engine, a turbine, or an electric motor.

On the other hand, the motors of the present disclosure do not require an outside prime moving force or mechanical coupling because both the motor and generator features share the same stator assembly and permanent magnet rotor. Thus, both motor and generator features benefit from the same rotating magnetic field for torque and electrical energy generation. In other words, while a motor consumes electrical energy input for normal motor operation, the motor generates electrical energy simultaneously. Based on a working prototype of one embodiment of the present disclosure, up to 95% of the motor's power input was generated when the motor was not loaded (rotor shaft not connected to a load). When the motor is operating under rated load, 50% or more of the motor's power input can be generated by the inducer winding segments. The lighter the load of the motor, the more electrical energy the motors of the present disclosure can generate.

To this end, the ability to generate electrical energy while in active motoring function offers unique and significant advantages and advancements to modern electric vehicles. Today's electric vehicles are limited by their battery capacity and drive range. Thus, the motors of the present disclosure advantageously address these limitations by having the ability to serve effectively as a powertrain and an electrical energy generator in electric vehicles. In other words, while propelling the vehicle drive wheels, the electrical energy it generates simultaneously can be routed to the vehicle's battery bank or energy storage system, thus prolonging the battery capacity of the vehicle and resulting in an extended drive range.

Therefore, it is important to note that unlike the conventional regenerative breaking system of the standard and hybrid electric vehicles, which can only generate a small amount of electricity during the breaking or decelerating of the vehicle, the motors of the present disclosure operate in a fashion consistent with the conventional AC generators. As described earlier, given that all pertinent power factors of a motor are fixed during the designing phase, the amount of electrical energy the motors of the present disclosure generate depends on several key factors, especially the speed of the rotor's magnetic field and the amount of inducer winding turns wound on the stator poles. Thus, unlike regenerative breaking, which generates electricity during breaking, the motors of the present disclosure generate electrical energy during normal speed or acceleration. The faster the speed of the vehicle and the more the vehicle accelerates, the more electrical energy the embodiments of the present disclosure generate for the vehicle. On a typical drive to the grocery store or commute to work, more time is spent on driving and accelerating the vehicle rather than breaking or decelerating. Thus, comparing to the regenerative breaking for generating electrical energy, the motors of the present disclosure generate substantially more electrical energy on a typical drive or trip than the regenerative method. As noted earlier, while the motor feature of the present disclosure is operating under a full rated load, 50% or more of the motor's energy input supply can be generated simultaneously by the electrical energy generating winding assembly. The lighter the load being pressed upon the motor, the more electrical energy it can generate. However, it is important to note that the amount of energy generated cannot surpass the overall input supply.

The present disclosure conforms to all laws of nature, including the law of conservation of energy, namely because it operates under the same principles of the conventional BLDC motors and standard generators. As noted earlier, the conventional BLDC motors provide a rotating magnetic field as a byproduct of energy expended to generate torque in the motor. By capitalizing on the given conditions, the present disclosure not only conforms to all laws of nature, but provides a novel means for the conventional BLDC motors to generate electrical energy for useful purposes that otherwise would have been wasted.

According to one embodiment, a brushless direct current (BLDC) motor is provided that generates electrical energy while operating as a motor. The motor typically includes a permanent magnet rotor that provides a magnetic field for motor operation, the rotor having a plurality of magnetic poles, and a stator winding assembly positioned proximal to the rotor and having a first set of one or more windings configured to produce torque in the rotor and a second set of one or more windings configured to generate electrical energy during motor operation. The first windings are physically and electrically separated from the second windings. During typical motor operation, as the first windings are producing torque to rotate the rotor, electrical energy is generated by the second windings due to rotation of the rotor. In certain aspects, the stator winding assembly includes a plurality of stator poles, wherein each stator pole includes at least one first winding and at least one second winding. In certain aspects, for each stator pole, the at least one second winding is positioned on the stator pole closer to the permanent magnet rotor than the at least one first winding. In certain aspects, the stator poles are equally spaced around the rotor. In certain aspects, the stator winding assembly may comprise two stator poles and operate in a single phase configuration, or the stator winding assembly may comprise four stator poles and operate in a two-phase configuration, or the stator winding assembly may comprise six stator poles and operate in a three-phase configuration.

In certain aspects, the stator winding assembly includes a plurality of first stator poles and a plurality of second stator poles, wherein each first stator pole includes at least one first winding and each second stator pole includes at least one second winding. In certain aspects, the first stator poles are equally spaced around the rotor, and the second stator poles are equally spaced around the rotor, and the first stator poles are interspersed between the second stator poles. In certain aspects, the second windings are positioned closer to the permanent magnet rotor than the first windings. In certain aspects, the stator winding assembly comprises six first stator poles and six second stator poles, or the stator winding assembly comprises four first stator poles and four second stator poles or the stator winding assembly comprises two first stator poles and two second stator poles.

According to another embodiment, a brushless direct current (BLDC) motor is provided that generates electrical energy while operating as a motor. The motor typically includes a permanent magnet rotor that provides a magnetic field for motor operation, the rotor having a plurality of magnetic poles, and a stator winding assembly positioned proximal to the rotor and having at least two first stator poles and at least two second stator poles, each first stator pole having a first set of one or more windings configured to produce torque in the rotor, each second stator pole having a second set of one or more windings configured to generate electrical energy during motor operation. The first set of windings are electrically separated from the second set of windings, wherein during motor operation as the first windings are producing torque to rotate of the rotor, electrical energy is generated by the second windings due to rotation of the rotor. In certain aspects, the second windings are positioned closer to the rotor than the first windings. In certain aspects, the first windings are positioned at about the same distance from the rotor as the second windings. In certain aspects, the stator winding assembly includes four first stator poles and four second stator poles, and the motor operates according to a two-phase commutation method or protocol, or the stator winding assembly includes two first stator poles and two second stator poles, and the motor operates according to a single-phase commutation method or protocol, or the stator winding assembly includes six first stator poles and six second stator poles, and the motor operates according to a three-phase commutation method or protocol.

In certain aspects, the BLDC motors further include a control unit that is coupled to the first set of windings and is operable to provide signals to the first set of windings to energize the first set of windings according to a commutation method or protocol. In certain aspects, the BLDC motors further include a plurality of Hall Effect sensors that detect a position of the rotor poles and provide signals representing a rotational position of the rotor to the control unit. In certain aspects, the BLDC motors further include a charging circuit that is coupled to the second set of windings and is operable to store the electrical energy generated by the second set of windings to an energy storage device, e.g., for later use. In certain aspects, the charging circuit includes a rectifier or similar circuit element(s) that converts the electrical energy in the form of AC voltage signals to DC voltage signals for storage in a battery of the energy storage device. In certain aspects, the BLDC motor is coupled to a drivetrain of a vehicle. In certain aspects, the vehicle includes a plurality of wheels, and the motor is operable to power the drivetrain to operate the wheels.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Figure 1:
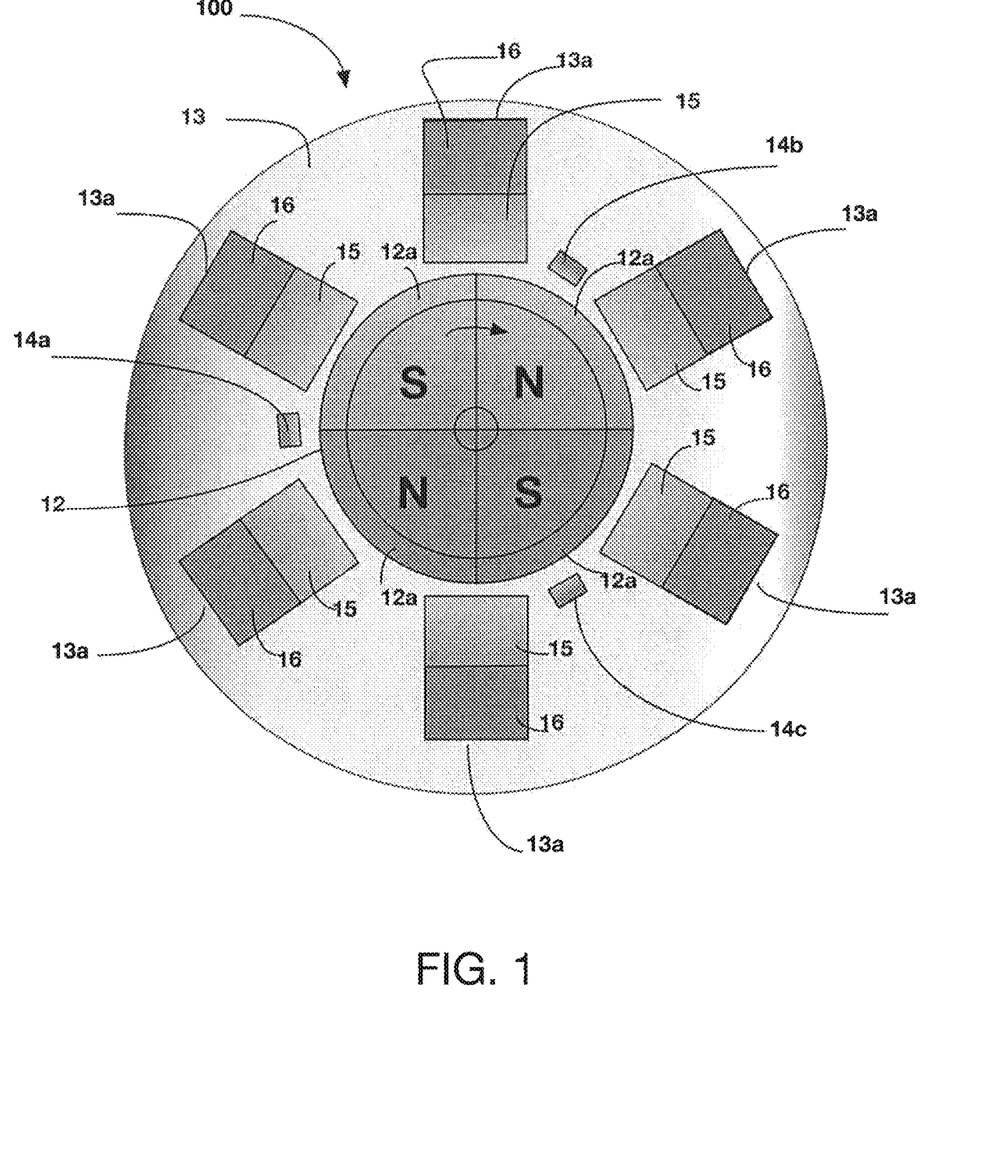
FIG. 1 discloses a simplified drawing of a practical configuration of the embodiment of the present disclosure arranged with a dual purpose stator winding assembly, wherein both energizer and inducer winding segments are wound on or share the same stator pole.

FIG. 1 depicts a BLDC motor 100, according to one embodiment. BLDC motor 100 includes a permanent magnet rotor 12, a stator core assembly 13, which includes a plurality of dual purpose stator winding assemblies 13a configured so that one segment of each stator pole windings 16 produces torque in the rotor 12 and the other segment of each stator pole windings 15 generates electrical energy output. The permanent magnet rotor 12 can be of various poles 12a (e.g., alternating N and S as shown). Thus the present embodiment can be operable using a single-phase, or multiple-phase winding configurations. These various winding phase configurations are applicable for both producing torque in the rotor and for generating electrical energy output. For the purpose of illustration, the BLDC motor 100 being described herein is an inrunner BLDC motor, although the motor can also be of outrunner configuration (not shown). For commutation, magnetic Hall Effect sensors, 14a, b, c are provided. The Hall Effect sensors are appropriately placed or positioned to sense or detect the rotational position of the rotor and are configured to send signals representing a rotational position of the rotor to a control unit (e.g., containing a processor). Alternatively, the motor can be configured as a sensorless motor, thus the back-EMF zero-crossing signal sensing commutation method, particularly in motors which operate on trapezoidal waveforms will be utilized (not shown here).

As illustrated, the stator core assembly 13 contains six stator pole winding assemblies 13a (hereinafter "stator poles 13a"). These stator poles 13a enable the generation of electrical energy while simultaneously operating as a motor. In order for the dual functions of torque and electrical energy generation to take place concurrently, each of the stator poles 13a accommodates two sets of coil windings, inducer windings 15 and energizer windings 16. Accordingly, inducer windings 15 are designated to generate electrical energy and energizer windings 16 are designated to produce torque in the permanent magnet rotor 12. It should be noted that other than of being wound on or sharing the same stator pole, coil windings 15 and 16 should be neither physically nor electrically connected to each other. As shown in FIG. 1, energizer windings 16 occupy the darker portion of the stator poles 13a, and inducer windings 15 occupy the lighter portion of the stator poles 13a. To reduce the level of back EMF being generated during motor operation and to increase efficiency, energizer windings 16 are positioned further away from the air gap and closer to the rear edges of poles 13a against the inner circumference of the stator frame. On the other hand, to capture the maximum magnetic field possible for generating electrical output, inducer windings 15 are positioned on the front edges of poles 13a, closer to the air gap and in close proximity to the magnetic field of the permanent magnet rotor 12. However, various other positioning of the said windings 15 and 16 are also possible if so desired.

To this end, the commutation process of an embodiment includes a conventional "six-step commutation" process as is known in the art. Therefore, some components being described herein are omitted (not shown) in FIG. 1. Thus, in this example, for commutation, the stator windings 16 are connected in a three-phase star or Y winding configuration (not shown), and their terminal supply leads (also not shown) are connected through electronic circuitry to a commutation control unit (not shown) and a DC source power supply (not shown). In a three-phase commutation sequence, two of the phases are constantly energized, one positively energized and the other negatively energized, while the third phase is left purposely non-energized. When a switch (not shown) is turned on to apply power input to the motor 100, the appropriate pair of Hall Effect sensors 14a, b, or c, sends signals representing the rotor's position (e.g., rotational position) to the commutation control unit (not shown), which then activates the appropriate commutation zones or winding phases of the stator windings 16. For example, the control unit applies voltage signals to appropriate windings depending on the number of stator poles/windings and commutation phase configuration, e.g., single-phase, two-phase, three phase . . . ). Once energized, the selected winding phases of the stator windings 16 produce the appropriate magnetic polarity in the activated stator poles 13a to attract the magnetic poles' field of the rotor 12. Upon commencement of attraction between the poles of 13a, the rotor's pole 12 moves towards the commutated stator poles of 13a, thus torque is generated in the rotor 12. However, through a controlled commutation process, a switching algorithm is implemented to prevent the magnetic alignments between the magnetic poles of the rotor 12 and stator poles 13a, thus keeping the rotor 12 in motion and preventing it from coming to a rest. This process is achieved by electronically switching off and on the stator windings 16 to shift or remove current or demagnetize the affected stator poles 13a at specific degree angles and timing. Through commutation control, the current then switches path to energize the next winding phases to commence another magnetic attraction between the rotor 12 and the newly energized winding phases of 16. Thus, as torque is generated in rotor 12, the rotor's magnetic field (not shown) is also being kept in continued clockwise motion toward a new phase of magnetic attraction.

As mentioned earlier, the commutation process being described above is conventional. However, it is only being highlighted to demonstrate the precise moment of interaction between the magnetic field of rotor 12 and inducer coil windings 15 that enables generation of electrical energy. Whereas while the said magnetic field of rotor 12 is being kept in motion, and as it moves toward the next phase of attraction sequence, the magnetic field cuts across or moves across the inducer windings 15 which are purposely placed in close proximity to the rotor 12 magnetic field's relative motion. It is at this precise moment, upon the magnetic field cutting across inducer windings 15, that electromotive force or voltages are being generated. Accordingly, while the motor is performing its normal motoring functions, electrical energy is being generated simultaneously. The generated electrical energy can then be harnessed, consumed immediately, or can be stored for later use.

Figure 2:
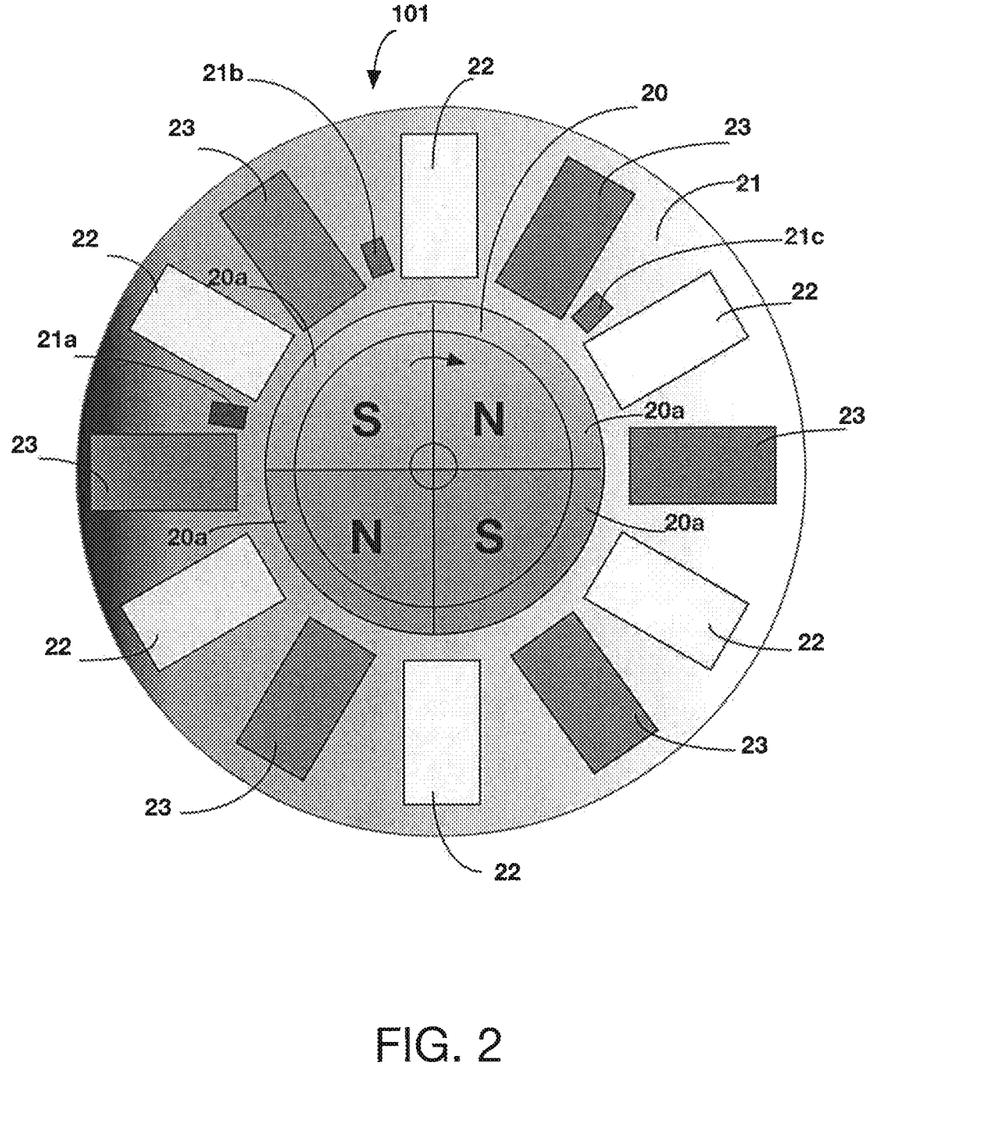
FIG. 2 discloses a simplified drawing of a practical configuration of the embodiment of the present disclosure arranged with an alternative dual purpose stator winding assembly, wherein each of the energizer and inducer winding segments are wound separately, each having its own designated stator poles.

FIG. 2 depicts a BLDC motor 101, according to another embodiment. Similar to FIG. 1, motor 101 also contains a permanent magnet rotor 20, a stator core assembly 21, with first stator pole winding assemblies 22 interleaved with second stator pole winding assemblies 23, configured so that one group of winding assemblies is designated to produce torque in the rotor 20 while the other group of winding assemblies is designated to generate electrical energy. The permanent magnet rotor 20 can be constructed with various poles shown as 20a.

For the purpose of illustration, the motor 101 being described herein is an inrunner BLDC motor, although the embodiment can also be of an outrunner configuration (not shown). In addition, for commutation, magnetic Hall Effect sensors, 21a, b, c, can be used or back-EMF zero-crossing signal sensing can be used, particularly for motors which operate on trapezoidal waveforms (not shown here). Unlike the configuration illustrated in FIG. 1, the stator core assembly 21 of the motor 101 contains twelve stator poles. Six poles, represented as energizer windings 22, are designated for coil windings to produce torque in the rotor 20. The other six poles, represented as inducer windings 23, are designated for generating electrical energy output. Energizer windings 22, as shown in FIG. 2 are depicted in lighter shade, and inducer windings 23 are represented in darker shade. It should be noted that because they are configured to perform different functions, coil windings 22 and 23 are not physically or electrically connected to each other. However, to ensure electrical degrees are balanced and uniformly distributed both for torque and electricity generation, stator poles and coil windings 22 and 23 are alternately spaced next to each other around the inner circumference of the stator core assembly 21 frame. By alternating the poles and coil windings, placing one type next to the other type, both dual functions of motor and generator activities can be accomplished at the same time. In certain embodiments, to reduce the level of back EMF being generated during motor operation and to increase efficiency, energizer windings 22 are positioned further away from the air gap and closer to the rear edges of the stator poles against the inner circumference of the stator frame. It should be appreciated that in some embodiments, the energizer windings 22 and inducer windings 23 need not be equally spaced as shown, and that the windings can be equally spaced or irregularly spaced, e.g., relative to the same type of windings and/or relative to the other type of windings.

Similar to FIG. 1, the commutation process useful for the motor of FIG. 2 is conventional and is well known in the art, thus some components being described herein are omitted (not shown). However, some of these components not shown in FIG. 2 (and not shown in FIG. 1.) may be found in FIG. 3. Thus for commutation, the energizer stator windings 22 are connected in a 3-phase star or Y winding configuration, and their terminal supply leads are connected through electronic circuitry to the commutation control unit (not shown) and DC source power supply (not shown). Once energized, the commutation zones or winding phases of the stator windings 22 produce the appropriate magnetic polarity to attract the magnetic poles of the rotor 20. Upon commencement of attraction between the stator poles 22, the poles of rotor 20 move towards the energized stator poles 22, thus torque is generated in the rotor 20. However, through a controlled commutation process, a switching algorithm is implemented to prevent the magnetic alignments between the magnetic poles of the rotor 20 and stator poles 22, thus keeping the rotor 20 in motion. This process is achieved by electronically switching off and on the stator windings 22 to remove current or demagnetize affected stator poles of windings 22 at specific degree angles and timing. Through commutation control, the current then switches path to energize the next winding phases to commence another magnetic attraction between the rotor 20 and the newly energized stator poles of winding phases of 22. Thus, as torque is generated in rotor 20, the rotor's magnetic field (not shown) is also being kept in continued clockwise motion toward a new phase of magnetic attraction.

In certain aspects, stator pole windings 22 and 23 are uniformly and alternately spaced next to each other around the inner circumference of the stator assembly 21 frame. Thus as torque is being generated in rotor 20, and as the magnetic field of rotor 20 moves from one pole winding of 22 to the next pole winding 22, the magnetic field of rotor 20 must travel across an inducer coil winding 23. In doing so, the magnetic field of rotor 20 would cut across the inducer winding 23 which is purposely placed between two of energizer windings 22 and rotor 20 magnetic field's relative motion. Similar to the embodiment of FIG. 1, it is at this very precise moment of interaction between the magnetic field of rotor 20 and inducer windings 23 that electrical energy is being generated. Thus, while the motor is performing its normal motoring functions, electrical energy is being generated simultaneously. The generated electrical energy can then be harnessed, consumed immediately or to be stored for later use.

Figure 3:
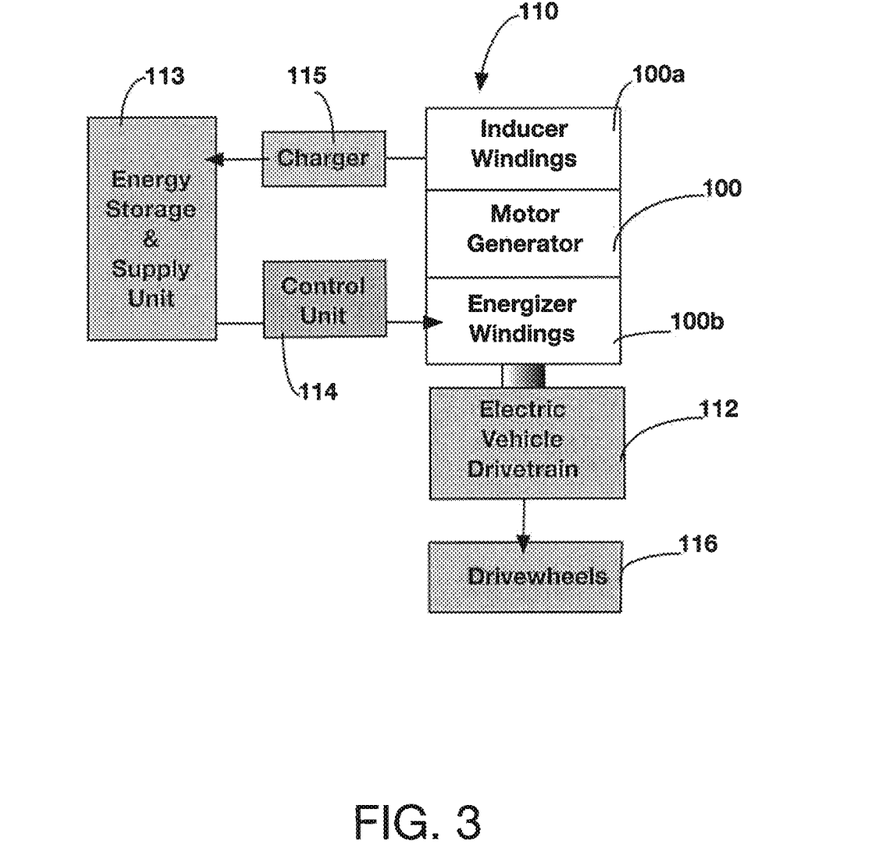
FIG. 3 is a block depiction of the application and the usefulness of the embodiment as part of a powertrain in electric vehicles.

FIG. 3 illustrates the overall functions of an integrated electrical energy generating and drivetrain system 110 for electric vehicles according to an embodiment. System 110 includes the power generating motor 100 (or motor 101 of FIG. 2), coupled to a drivetrain of an electric vehicle 112, a battery bank or energy storage unit 113, a motor driver controller unit 114, and a conventional or specialized charger 115. Controller (or control) unit 114 includes a processor and a non-transitory memory for storing code, including appropriate commutation protocols, which when executed by the processor implement the functionality for controlling operation of the motor and various components and also energy storage/charging and access protocols as described herein. As depicted, the dual capacity of the power generating motor 100 is depicted as having two useful features. The electrical energy generating winding assembly is shown as 100a and the torque producing winding assembly or motoring feature is shown as 100b. As shown motor 100 is electrically connected to battery bank or energy storage unit 113 for both its energy supply needs as well as through the motor driver controller unit 114. Further, motor 100 is also connected to a battery charger 115, which is equipped with means (not shown) to control the charging and discharging of batteries in energy storage unit 113. In addition charger 115 has a built-in rectifier for converting AC into DC current for charging batteries in unit 113. Thus, it should be noted that unit 113 is arranged with a plurality of rechargeable batteries in certain embodiments. Thus charger 115 is connected to both the unit 113 and windings 100a of motor 100.

For the purpose of illustrating the functionality of system 110, the following process is provided. The power generating motor 100 is coupled to a drivetrain of an electric vehicle 112. Once a supply voltage from unit 113 is applied to the motor feature 100b of 100 via control unit 114, the rotor shaft power output of motor 100 will effectively drive the drivetrain of the electric vehicle 112. Thus, the drivetrain of the electric vehicle 112 propels the electric vehicle's drivewheels 116. While the windings 100b of motor 100 are driving the drivetrain of the electric vehicle 112, electrical energy simultaneously being generated by windings 100a of motor 100 can be connected to a load (not shown) or effectively stored in the energy storage system or battery bank 113, which may include one or more rechargeable batteries, to be used at a later time. By integrating the motor 100 (or motor 101) with specialized charging methods and system 115, the discharging and charging of the electrical energy of storage system 113 can be programmed and managed. Thus, the present disclosure effectively offers an alternative method to generate electrical energy for electric vehicles, thus extending the drive range by 50% or more depending on the amount of load under which it is operating.

Although embodiments of the present disclosure have been described with specific configurations, and for specific applications, such descriptions of the embodiments and applications are for illustrative purposes only, and are not to be construed as limiting the scope of the invention. It is to be understood that aspects of the embodiments may be interchanged in whole or in part and that these changes and variations of the embodiments may be made by those of ordinary skill in the art without departing from the spirit or scope of the present disclosure. It is also to be understood that the embodiments of the present disclosure can be developed and tailored for specific sizes and applications other than those provided. Therefore, the spirit and scope of the appended claims should not be limited to the description of the exemplary embodiments contained herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A brushless direct current (BLDC) motor that generates electrical energy while operating as a motor, comprising:
   a permanent magnet rotor that provides a magnetic field for motor operation, the rotor having a plurality of magnetic poles;
   a dual-purpose stator winding assembly positioned proximal to the rotor and having a plurality of first windings configured to produce torque in the rotor and a plurality of second windings configured to generate electrical energy during motor operation, wherein the plurality of first windings are physically and electrically separated from the plurality of second windings, wherein the plurality of second windings are positioned closer to the permanent magnet rotor than the plurality of first windings, whereby during motor operation while the plurality of first windings are producing torque in the rotor, electrical energy is generated by the plurality of second windings due to a rotation of the rotor, and wherein the stator winding assembly includes a plurality of stator poles, each stator pole includes at least one first winding and at least one second winding.

2. The BLDC motor of claim 1, wherein for each stator pole, the at least one second winding is positioned on the stator pole closer to the permanent magnet rotor than the at least one first winding.

3. The BLDC motor of claim 1, wherein the stator poles are equally spaced around the rotor.

4. The BLDC motor of claim 1, wherein the stator winding assembly comprises four or six stator poles.

5. The BLDC motor of claim 1, further comprising a control unit coupled to the plurality of first windings and operable to provide signals to the plurality of first windings to energize the plurality of first windings according to a commutation method.

6. The BLDC motor of claim 5, further comprising a plurality of Hall Effect sensors configured to detect a position of the rotor poles and to provide signals representing a rotational position of the rotor to the control unit.

7. The BLDC motor of claim 1, coupled to a drivetrain of a vehicle.

8. The BLDC motor of claim 7, wherein the vehicle includes a plurality of wheels, and wherein the motor is operable to power the drivetrain to operate the wheels.

9. The BLDC motor of claim 1, further comprising a charging circuit coupled to the plurality of second windings and configured to store the electrical energy generated by the plurality of second windings to an energy storage device.

10. The BLDC motor of claim 9, wherein the charging circuit includes a rectifier that converts the electrical energy in the form of AC voltage signals to DC voltage signals for storage in a battery of the energy storage device.

11. A brushless direct current (BLDC) motor that generates electrical energy while operating as a motor, comprising:
    a permanent magnet rotor that provides a magnetic field for motor operation, the rotor having a plurality of magnetic poles; and
    a dual-purpose stator winding assembly positioned proximal to the rotor and having at least six first stator poles and at least six second stator poles, and wherein the motor operates according to a three-phase commutation method, wherein the windings of said first stator poles are configured to produce torque in the rotor and the windings of said second stator poles are configured to generate electrical energy during motor operation, wherein while the windings of said first stator poles are producing torque in the rotor, electrical energy is generated by the windings of said second stator poles due to a rotation of the rotor.

12. The BLDC motor of claim 11, wherein the windings of said first stator poles are positioned at about the same distance from the rotor as the windings of said second stator poles.

13. The BLDC motor of claim 11, further comprising a charging circuit coupled to the windings of the at least six second stator poles, configured to store the electrical energy generated by the said windings to an energy storage device.

14. The BLDC motor of claim 11, coupled to a drivetrain of a vehicle.

15. A brushless direct current (BLDC) motor, comprising:
    a permanent magnet rotor that provides a magnetic field for motor operation, the rotor having a plurality of magnetic poles; and
    a stator winding assembly positioned proximal to the rotor and having a plurality of first windings configured to produce torque in the rotor and a plurality of second windings configured to generate electrical energy during motor operation, wherein the plurality of first windings are physically and electrically separated from the plurality of second windings, wherein the plurality of second windings are positioned closer to the permanent magnet rotor than the plurality of first windings, whereby during motor operation while the plurality of first windings are producing torque in the rotor, electrical energy is generated by the plurality of second windings due to a rotation of the rotor;
    wherein the stator winding assembly includes a plurality of stator poles, wherein each stator pole of the plurality of stator poles includes at least one first winding and at least one second winding.

16. The BLDC motor of claim 15, further comprising a charging circuit coupled to the plurality of second windings and configured to store the electrical energy generated by the plurality of second windings to an energy storage device.

17. The BLDC motor of claim 15, coupled to a drivetrain of a vehicle.

* * * * *